United States Patent [19]

Wootten

[11] 4,123,338

[45] * Oct. 31, 1978

[54] METHOD FOR PREVENTION OF FOULING AND CORROSION UTILIZING TECHNETIUM-99

[76] Inventor: Carl B. Wootten, Rte. 1, Keswick, Va. 22947

[*] Notice: The portion of the term of this patent subsequent to Apr. 12, 1994, has been disclaimed.

[21] Appl. No.: 757,079

[22] Filed: Jan. 5, 1977

Related U.S. Application Data

[63] Continuation-in-part of Ser. No. 473,691, May 28, 1974, Pat. No. 4,017,370.

[51] Int. Cl.$^2$ .................. C23F 13/00; C25D 3/54; B63B 59/00
[52] U.S. Cl. .................. 204/147; 204/196; 204/45.5; 114/222; 427/5
[58] Field of Search .............. 204/147, 148, 196, 197, 204/45.5; 114/67 R, 222; 427/5

[56] References Cited

U.S. PATENT DOCUMENTS 3,374,157  3/1968  Box .................. 204/45.5

OTHER PUBLICATIONS

Voltz et al., "J. Electrochem. Soc.", Feb. 1967, pp. 128-131.
Box, "Nuclear Applications", vol. 1/2, Apr. 1965, pp. 155-159.
"JACS", vol. 77, pp. 2658 and 2659 (1955).

*Primary Examiner*—T. Tung
*Attorney, Agent, or Firm*—Oblon, Fisher, Spivak, McClelland & Maier

[57] ABSTRACT

The growth of organisms on the surface of a substrate in contact with water is prevented, while simultaneously preventing corrosion of such substrates. This is accomplished by a method wherein technetium metal is imbedded in, or cast, electroplated or sputtered onto the substrate, or is otherwise included in the surface layer of the substrate being used on or under water.

10 Claims, No Drawings

METHOD FOR PREVENTION OF FOULING AND CORROSION UTILIZING TECHNETIUM-99

CROSS-REFERENCE TO RELATED APPLICATIONS

This application is a continuation-in-part of U.S. application Ser. No. 473,691, filed on May 28, 1974, now U.S. Pat. No. 4,017,370.

BACKGROUND OF THE INVENTION

1. Field of the Invention

This invention relates to the prevention of fouling of substrates in water environments, such as marine or fresh water environments, and particularly to the prevention of fouling coupled with corrosion inhibition by the application of a coating of technetium-99 to the substrate.

2. Description of the Prior Art

Marine and fresh water organisms, e.g., algae, sea worms, sea plants, barnacles, crustacea, etc., cause millions of dollars of damage each year to underwater substrates, such as ship hulls, instrument transducers, condensers, heat exchangers, underwater instrumentation such as seawater gauges, current meters, temperature sensors, pressure sensors, salinity sensors, underwater television, liquid level gauges, water meters, underwater navigation equipment, and the like; buoys, not only including navigation buoys, but also instrumentation mooring packages, mooring buoys, locator buoys, environmental data buoys, and the like; flotation equipment such as flotation packages for instrumentation, flotation equipment for underwater salvage work and the like; water pumps, both fixed and submersible; metal piling connectors, such as bolts, pins, and the like; offshore drilling equipment such as tool joints, subs and connectors, drill collars, floating guide shoes, casing and tubing heads and supports, substructures and accessories; water intake and exhaust screens and screen wells; interior surfaces of water storage tanks; desalination equipment, particularly those portions of the system which carry the high salt content overflow (an area of particularly high corrosion problems); submarine ballast tanks, underwater sonar equipment, cooling towers, and, in general, any surface in contact with water, by forming growths of the organisms on the surface of these in-the-water devices. Eventually there results undesirable and damaging fouling which, at the least, is very expensive and time consuming to remove, or may totally destroy the usefulness of the device whose surface is affected.

The prior art has developed numerous anti-fouling paints for application to in-the-water devices, particularly ship hulls. However, these anti-fouling paints eventually peel off from the surface during use and therefore only have a limited life expectancy requiring frequent costly shutdowns and reapplications. Particularly in the case of stainless steel devices, adhesion of the anti-fouling paints is unsatisfactory. Also, anti-fouling paints unless applied in relatively thick coatings are subject to small cracks which expose the surface of the coated device and allow penetration by corrosive salt water and/or the above-mentioned organisms. Even very minute cracks in the paint can result in damage to the coated device. Anti-fouling paints have the additional disadvantage in that the paint can easily be scratched or scraped off of the surface. Also, anti-fouling paints too frequently create a health hazard to non-harmful sea life because of the nature of the poisonous substances in the paint. Fouling and corrosion prevention is particularly important for underwater instrumentation having moving parts, such as transducers of the flexible diaphragm type, or liquid level measuring devices utilizing a sliding rod. Such devices become totally ineffective when fouled by marine or fresh water organism growth.

The problem of keeping underwater instrument transducers and other underwater instrumentation, etc., free of marine fouling has heretofore remained unsolved.

SUMMARY OF THE INVENTION

These and other drawbacks of the prior art anti-fouling paints are overcome according to the present invention by including an amount of technetium-99 effective for preventing fouling and corrosion in or on a substrate to be used in contact with water or in a water environment.

According to the present invention, technetium-99 is applied to the basic substrate to be protected by any suitable means well known in the prior art. For example, the material can be cast, deposited by sputtering or via an electro-plating or electrodeposition process in varying thicknesses to achieve the desired result. In addition, during the manufacturing of the material to be protected, the inclusion of the technetium-99 in the basic material can also be effective, provided the technetium is present in the base material close enough to the surface and in the appropriate parts per million to allow the radiation to be effective at the surface of the material.

Thus according to the present invention, in-the-water instruments can be plated to varying thicknesses with technetium-99 metal to prevent harmful marine and other organism growth, and the movable portions of such items as transducer diaphragms could be manufactured by including a thin layer of technetium close to the outer surface of such active portions.

Through the controlled variations of either the parts per million included in a basic material, or the thickness of the technetium plating on material which is susceptible to plating, the dose rate can be adjusted such that marine and other organisms will be unable to grow on such surfaces. The dose rate at the surface can be adjusted up to a maximum by variation of the thickness of the layer of technetium applied to the surface of the subject material or incorporated close to the surface of the material.

It is, therefore, the principal object of the present invention to provide a method for preventing the growth of marine, fresh water or other organisms on substrates in a variety of aqueous environments by providing a technetium treatment on the substrates.

It is a further object of this invention to use technetium treated substrates in marine or other water environments, such substrates being substantially free of corrosion as a result of the technetium treating operation.

The element technetium of atomic weight 99 and atomic number 43 is not found in nature but is formed as a fission product. The principal method for obtaining technetium from such products is by separation of basic purex waste supernate utilizing ion exchange techniques. While initially a laboratory curiosity, recent procedures developed by the Atomic Energy Commission have allowed this metal and its compounds to become available in economically attractive quantities.

Technetium-99 is known to have a half-life of 2.1 × $10^5$ years. Significantly, unlike other known beta-particle emitters, it does not contain either alpha or gamma rays but only beta particles having a maximum energy of 0.29 M.E.V. and an average energy of 100 K.E.V. Therefore, as noted in more detail below technetium (Tc) can be handled and applied with relative ease and safety.

The use of technetium as a component for preventing corrosion of metal substrates has been long known. In particular, the prior art has shown that the presence of the pertechnetate ion, $TcO_4^-$, in mild steels significantly reduces corrosion in aqueous systems. (J. Am. Chem. Soc. Vol. 77, p. 2658 (1955)). Experiments have shown that these materials may be effectively protected by as little as from 5–50 ppm of the pertechnetate ion when subjected to temperatures of up to at least 250° C. in aerated distilled water. Indeed, certain specimens have been observed for 2 years with no evidence of attack. Further studies have revealed that corrosion inhibition occurs without depositing more than 3 × $10^{12}$ atoms of technetium per square centimeter of substrate.

DESCRIPTION OF THE PREFERRED EMBODIMENTS

In order to utilize technetium-99 for the prevention of fouling caused by marine growth and simultaneous corrosion inhibition of metallic substrates, it is necessary to have the isotope present in such a concentration that the objectives of the present invention can be obtained.

For example, it has been found that one gram of technetium, having a density of 11.2 grams/cc, will coat 14.06 $cm^2$ of substrate at a thickness of 2.5 mils. Alternately, a plating of 0.5 ml thickness could coat an area of 70.3 $cm^2$, with the additional advantage of providing an increased dose rate to the marine or other organisms due to the lower self-absorption of beta particles in the coating.

Technetium concentrations of this order can easily be obtained by standard techniques of electrodeposition, as has been previously demonstrated using the ammonium pertechnetate salt (ORNL Report PM 748). Sputtering techniques, also standard in industry, can provide much thinner technetium coatings. Thus, the thickness of the technetium coating can easily be adjusted down to a monoatomic layer, both on metallic and non-metallic substrates, to provide the necessary anti-aqueous organism growth prevention treatment.

In order to provide the necessary anti-corrosion effect on metal substrates, concentrations as low as 5–50 ppm can effectively be applied by already developed metal spraying techniques.

This technique uses an oxyacetylene wire and powder gun and is particularly suited for applying hard, corrosion resistant metals to other substrates, including both large and small work pieces. By mixing the technetium metal powder in appropriate quantities with the metallic powder of the substrate, the composite can be "metal sprayed" on the substrate using the above technique. The result is an outer layer of the desired thickness containing the desired composition of Tc in the base metal to inhibit corrosion.

Other techniques for applying an effective technetium-99 coating for aqueous growth prevention would include vapor deposition or chemical vapor deposition in which the Tc would diffuse into the substrate, preferably iron based. These techniques can also be used to apply coatings of various thicknesses.

Of course, the technetium coating can be applied to any substrate coming in contact with water, such as non-metallic substrates, e.g., plexiglass, fiberglass, plastics, etc., as well as non-ferrous metallic substrates, e.g., aluminum, silver, copper, etc.

As discussed above, there is no corrosive effect of marine or other water environments on technetium-treated substrates. In this respect, the lack of corrosion indicates a lack of ability to attack and dissolve compositions containing the technetium metal. Since experiments have demonstrated that the technetium remains insoluble even after 1,000 hours in simulated sea water at 90° C., it is evident that the amount of technetium passing into the marine environment would be substantially zero. It would be anticipated then that technetium concentrations in aqueous environments would be substantially unchanged from the present levels and ingestion by marine creatures and any subsequent effects in the food chain would be entirely absent thereby making this heretofore unrecognized application of radioactive technetium-99 entirely practical from a safety standpoint.

While the metal itself does not appear to offer any problem concerning solubility in water solutions, i.e., is non-soluble in water, a further consideration must be directed at radiation levels generated by any corrosion inhibiting/antifouling technetium-treated substrate. From a radiation standpoint, it can be shown that the dose and dose rate emitted by the Tc coating can provide the required inhibition of organism growth on the treated substrate without polluting the marine or other aqueous environment.

For example, the specific activity of a 2.5 mil Tc plating can be calculated by the following equation:

$$\text{Specific Activity} = \frac{N \times 1.873 \times 10^{-11}}{T_{\frac{1}{2}}}$$

$$N = \frac{\text{AVOGADRO'S NO.}}{\text{ATOMIC WT (GMS)}} = 6.09 \times 10^{21}$$

$$T_{\frac{1}{2}} = \text{half-life (seconds)}$$

Using 2.1 × $10^5$ years for the half-life of technetium-99, the specific activity per square centimeter is found to be 4.54 × $10^7$ disintegrations per second.

As noted earlier, the average beta energy of technetium-99 is 100 K.E.V., (1 × $10^5$ electron volts (ev)) and would result in a total energy emitted by a 1 gram sample of 4.54 × $10^7$ times 1 × $10^5$, or 4.54 × $10^{12}$ ev/sec-$cm^2$. Assuming that all of the energy is absorbed in 0.1 centimeter of water, the dose rate from a 2.5 mil plating can be determined to be 260 rad/hr-$cm^2$, neglecting self absorption. Assuming for example, a 23% self-absorption factor, the dose rate would then be 200 rads/hr-$cm^2$. For a 0.5 mil plating, it is estimated that the self-absorption would be in the order of 10.8%, with a resulting dose rate of 242 rad/hr-$cm^2$.

It is well known that complex organisms react more dramatically to certain levels of radiation than do those lower down on the evolutionary scale. The exposure of the whole body of an animal to alpha, beta, gamma or X-rays results in a radiation effect that is found to be a function of the dose and the dose rate during the exposure period. The values needed to estimate the biological effects from chronic exposure of higher animals to radiation can readily be calculated by one of ordinary skill in this art.

From the standpoint of biological research, estimates of the response of living organisms to chronic whole body radiation treatments must be regarded as relatively crude except in certain highly studied species. It is possible to generalize, however, and it has been determined that for a typical human a dose of 500 rads will generally be lethal while some viruses may survive 10,000,000 rads. Other living creatures fall in between, depending on their molecular complexity.

For example, it has been shown that the reaction of mammalian skin to massive doses of external beta rays follows essentially the same pattern of development as subjecting mammalian skin to thermal burns, the important difference being that thermal exposure results in a penetration of the skin much more than that occurring from beta radiation. However, lethal doses of beta radiation can be found and are attributed to extensive destruction of the skin surface.

As suggested above, no definitive studies are known to applicant that show specific dose requirements to de-activate the many varieties and species of marine or other aqueous organisms causing fouling, but for any particular species the specific dose can be readily determined. It can be stated, however, that any organism attempting to attach itself to the beta-emitting technetium would eventually receive a lethal dose of radiation and additionally, would probably be unable to continue its attachment even before a lethal dose was reached.

For example, it has been long known that *Pseudomonas A.*, the bacterial strain responsible for the formation of sludge in jet fuel and the fouling and corrosion of wing tanks in jet aircraft, can be effectively eliminated with radiation. In this case, doses in the range of 10,000 rads provide a reduction factor of 99%. (AEC Report KLX-1872 of 7-15-65).

In general, the dose required to prevent fouling caused by microorganisms can be determined by the formula:

$N/No = e^{-bR}$, where $N/No$ is the fractional survival, $b$ is the exponential decay constant for the particular strain, and $R$ is the dose in rads.

For higher order marine organisms, lower doses will be expected to de-activate them to the point where they are incapable of adhering themselves to the treated surface.

As noted above, a dose rate of 242 rads/hr per square centimeter would be expected from a 0.5 mil plating of technetium. As also noted above, thinner platings would provide correspondingly higher dose rates. Any water borne creatures attempting to attach themselves to such technetium-plated substrates would be exposed to this amount of radiation for every hour of attachment. Lethal and/or de-activating doses would accumulate in periods of 24–48 hours for most species.

Physical measurements and calculations show that the adsorption of beta particles from any source, including the technetium coatings discussed herein, is dependent upon the energy of the emitted beta particles, and can be generally described for particles with a maximum energy (E) from 0.01 to 2.5 MEV as follows:

$R = 412 E^{1.256} - 0.0954 \ln E$; where
$R$ = range in milligrams per cm$^2$ and
$E$ = maximum beta energy in MEV.

From available standard tables, the effective range of beta particles for a variety of absorbing mediums can be determined. The range of the maximum energy beta from Tc (0.29 MEV) in water (or tissue) and air is as follows:

Water = 0.03 inches = 0.0762 cm.
Air = 18.0 inches = 45.7 cm.

Therefore, in the application of the technetium metal the dry material can be handled in a standard glove box using lead impregnated gloves for hand protection, and, in plating solutions the liquid would effectively shield the activity.

For use in the present invention, the technetium coating will be effective at a thickness as small as one atomic layer and preferably within the range of from about 0.5 mil while the upper limit of the coating thickness for practical use is about 10 mil.

Having generally described the invention, a more complete understanding can be obtained by reference to certain specific examples, which are included for purposes of illustration only and are not intended to be limiting unless otherwise specified.

EXAMPLE

Using the apparatus and procedure of W. D. Box, "Electrodeposition of $^{99}$Tc Metal", *Nuclear Applications*, Vol. 1/2, April 1965, a stainless steel diaphragm of an underwater transducer can be coated with technetium metal having a thickness of 0.1–2.5 mil.

A stainless steel diaphragm to be used as the active element in a sonar device is used as the cathode. Platinum gauze is used as an anode.

The electrolyte solution in which sufficient ammonium pertechnetate is dissolved is a saturated solution of ammonium oxylate (0.7M) adjusted to a pH of 1.0 by the addition of sulfuric acid (1.411M). A current density of 1.3 amp/cm$^2$ is used. The technetium is deposited as metal on the stainless steel diaphragm to give a thickness of about 0.633 mil (18 mg/cm$^2$) which is strongly adherent to the substrate.

When such a technetium-99 treated diaphragm is utilized in an underwater transducer, no fouling by growth of aqueous organisms will occur and corrosion will simultaneously be inhibited. Having now fully described the invention, it will be apparent to one of ordinary skill in the art that many changes and modifications can be made thereto without departing from the spirit or scope of the invention as set forth herein.

What is claimed as new and desired to be secured by Letters Patent of the United States is:

1. A method for the prevention of fouling of a substrate in contact with water, which comprises:
   including in or coating on said substrate prior to its exposure to said water, an amount of technetium-99 effective to prevent the growth of aqueous organisms on said substrate;
   and thereafter exposing said substrate to a fresh water or marine environment which contains sufficient organisms, and for a period of time which would be expected to cause fouling of said substrate if not treated.

2. The method of claim 1 wherein the substrate is coated with technetium-99 in a thickness from that of a monoatomic layer to about 10 mils.

3. The method of claim 2 wherein said coating is deposited by an electroplating process.

4. The method of claim 2 wherein said coating is deposited by sputtering.

5. The method of claim 2 wherein said coating is deposited utilizing metal spraying techniques.

6. The method of claim 2 wherein said coating is deposited utilizing vapor deposition or CVD.

7. The method of claim 1 wherein said technetium-99 is imbedded near the surface of said substrate.

8. The method of claim 1 wherein said amount of technetium-99 is also effective to inhibit corrosion of said substrate.

9. The method of claim 1 wherein said substrate is a water-exposed surface of a condenser.

10. The method of claim 1 wherein said substrate is a water-exposed surface of a heat exchanger.

* * * * *